United States Patent [19]
Johnson et al.

[11] Patent Number: 6,042,678
[45] Date of Patent: Mar. 28, 2000

[54] EXTERIOR AUTOMOTIVE LAMINATE WITH PRESSURE-SENSITIVE ADHESIVE

[75] Inventors: John Richard Johnson, Valparaiso; Keith Lawson Truog, Crown Point; Howard Hjort Enlow, Munster; William Joseph Buehne, Hammond; Frederick Young, Schererville, all of Ind.

[73] Assignee: Avery Dennison Corporation, Pasadena, Calif.

[21] Appl. No.: 08/474,507

[22] Filed: Aug. 28, 1995

Related U.S. Application Data

[62] Division of application No. 08/278,722, Jul. 21, 1994, Pat. No. 5,518,786, which is a continuation of application No. 07/972,311, Nov. 5, 1992, abandoned.

[51] Int. Cl.[7] ...................................................... B32B 31/12
[52] U.S. Cl. .......................... 156/246; 156/230; 156/247; 156/249; 428/41.7; 428/41.8; 428/42.1
[58] Field of Search ..................................... 156/230, 231, 156/233, 235, 238, 240, 245, 239, 196, 246, 247, 249; 428/41.7, 41.8, 42.1

[56] References Cited

U.S. PATENT DOCUMENTS

| | | | |
|---|---|---|---|
| 4,496,628 | 1/1985 | Deatcher et al. | 428/337 |
| 4,640,727 | 2/1987 | Janssen | 428/345 |
| 4,786,350 | 11/1988 | Nesbitt et al. | 156/244.24 |
| 4,818,589 | 4/1989 | Johnson et al. | 428/201 |
| 4,900,611 | 2/1990 | Carroll, Jr. | 428/328 |
| 4,921,755 | 5/1990 | Carroll, Jr. et al. | 428/328 |
| 4,943,680 | 7/1990 | Ellison et al. | 427/154 |
| 5,034,269 | 7/1991 | Wheeler | 428/354 X |
| 5,114,514 | 5/1992 | Landis | 428/40 |
| 5,114,789 | 5/1992 | Reafler | 428/354 |
| 5,192,609 | 3/1993 | Carroll, Jr. | 428/354 |
| 5,518,786 | 5/1996 | Johnson et al. | |
| 5,725,712 | 3/1998 | Spain et al. | 156/230 |
| 5,750,234 | 5/1998 | Johnson et al. | |

FOREIGN PATENT DOCUMENTS

| | | |
|---|---|---|
| WO8807416 | 3/1988 | WIPO |
| 9403337 | 2/1994 | WIPO |

*Primary Examiner*—Curtis Mayes
*Attorney, Agent, or Firm*—Christie, Parker & Hale, LLP

[57] ABSTRACT

A flexible decorative sheet for use in surfacing an automobile body panel includes a first polyester carrier sheet having a high gloss surface, a clear coat of a weatherable optically-clear polymer containing fluorocarbon resin and an acrylic resin coated on the surface of the first carrier sheet, a tie coat on the clear coat, and a color coat containing a chlorinated polymer with dispersed pigments cast on the tie coat and dried. A pressure-sensitive adhesive layer is formed on a second polyester carrier sheet and then laminated to the exposed face of the color coat to form a pressure-sensitive, adhesive-backed composite paint coat between the outer carrier sheets which form protective removable backing sheets for the resulting laminate. The decorative sheet is applied to a substrate panel by pressure-sensitive adhesive bonding techniques, with the clear coat serving as a glossy, weatherable protective outer layer for the underlying color coat. The PVC-containing color coat enhances room temperature elongation of the finished film to enable application of the laminate to three-dimensionally contoured surfaces. The resulting paint finish has a defect-free, weatherable and durable outer surface with high gloss and high distinctness of image, meeting requirements for exterior automotive use.

16 Claims, 3 Drawing Sheets

EXTERIOR AUTOMOTIVE LAMINATE WITH PRESSURE-SENSITIVE ADHESIVE

CROSS-REFERENCE TO RELATED APPLICATION

This is a division of U.S. application Ser. No. 08/278,722, filed on Jul. 21, 1994, now U.S. Pat. No. 5,518,786, which is a continuation of application Ser. No. 07/972,311, filed Nov. 5, 1992 now abandoned.

FIELD OF THE INVENTION

This invention relates generally to dry paint transfer techniques, and more particularly, to the use of these techniques to decorate exterior car body members or panels with a paint coat applied in a separate production operation. The invention can eliminate or reduce the painting steps carried out in the manufacturing operations of a conventional automobile production plant.

BACKGROUND OF THE INVENTION

Automotive design and manufacture present a unique set of problems in the selection of materials and processes used in the manufacture of automobile bodies. As a form of transportation, automobiles are unique because most buyers want a vehicle to have a certain individual styling. A recent trend in the automobile industry is toward production of distinctive vehicles styled to attract specific groups of consumers. This change has required the car builder to shift production from a few models manufactured in large volumes to a larger number of more distinctive body styles. These developments have demanded from the manufacturer both styling flexibility and reasonable tooling costs for each body style.

For many years, the primary method of applying a paint coat to an automobile was through a spray painting process. However, several recent developments make the spray painting process more difficult. First, many states have enacted environmental protection laws restricting the amount of volatile organic content (VOC) a paint may contain. Second, spray painting is more suited to larger production runs where unique body styling is not needed. Third, higher energy costs have driven up costs for production paint lines where high temperature ovens must be used to cure the paint coat. These factors are especially pronounced in two tone painting applications, where the automobile must pass through the paint line twice.

Development of a production process to replace the spray painting line requires addressing a number of technical problems. A potential replacement process must provide both environmental and cost advantages to the automaker before the process can receive consideration. It must also meet all of the quality standards for exterior automotive coatings. For example, a coating must have the appearance and durability characteristics comparable to a spray painted coating. It must also possess a number of important physical properties such as: high gloss, hardness, distinctness-of-image (DOI), abrasion resistance, weatherability (such as UV resistance), impact strength, thermal stability, gasoline and acid resistance, cleanability, adhesion to the substrate, resistance to water and humidity exposure, and hiding ability or opacity of the coating.

In the past, a conventional production process for applying an exterior paint coat to car bodies made of sheet metal has involved transporting the preformed auto bodies to application lines in the plant where the car bodies are dipped in paint, followed by transporting them to a separate location for baking the paint coat and waiting until the hardened paint coat dries thoroughly. Most paint systems today are acrylic enamels which are cross-linked into a hard, glossy, durable paint coat during baking. Following painting, the car bodies are transported back to the production plant for further assembly operations. Conventional painting of sheet metal car bodies is expensive and is a significant factory problem with respect to environmental protection, worker safety, corrosion treatment, and waste disposal. It has been estimated that about one-third of the total capital investment in an automobile production facility today is involved in painting car body members and panels.

If a coating process can be developed as an alternative to conventional auto painting, then automobile assembly plants can be more compact, and environmental and safety problems associated with conventional car painting at the factory site may be avoided.

Many corporate product development efforts have sought alternatives to conventional painting of exterior car body panels and parts. A number of problems must be overcome to develop an economical production-type paint system and process that can eliminate conventional spray painting operations. One approach, which is the subject of this invention, involves developing a paint-coated film which can be used to replace a conventional painted finish on the exterior of an automobile body. The film is made from a paint coat applied to a casting sheet. The paint coat is dried and then transferred from the casting sheet to the exterior car body panel. The coating operation permits use of high temperature-resistant paint systems capable of producing a tough, glossy finish. The film is coated with a pressure sensitive adhesive which allows the film to be transferred from the casting sheet and bonded to the exterior car body panel. One use of such a paint-coated film is to replace the separate painting step of a conventional two-tone paint coat process.

A number of technical problems must be overcome in order to use such a film for exterior automotive applications. For instance, the film must be defect-free before being applied. The film also must initially be repositionable. Therefore, the adhesive should have a relatively low initial tack value which increases over time and therefore becomes increasingly more difficult to remove. The film must avoid long-term delamination at the adhesive interface between the film and the car body panel; and inter-layer delamination between the various coatings in the finished composite film also must be avoided.

Durability properties are also critical in producing a paint coat capable of exterior automotive use. The paint coat must avoid exhibiting defects when exposed to mechanical impact and avoid deterioration of the surface from exposure to chemicals and to the weather. Among other properties, the film requires good cleanability, UV and heat resistance.

A paint system that produces the toughness or hardness necessary for exterior automotive use also must have the elongation properties necessary for applying the film around complex three-dimensional shapes without cracking, or producing stress lines or other surface non-uniformities. Certain paint films having good elongation at elevated temperatures are not necessarily applicable to the present invention which requires good elongation at room temperatures.

Thus, the desired paint system should have a critical combination of many physical properties in order to produce a surface capable of exterior automotive use, while retaining the desired surface characteristics after the application process. However, some physical properties tend to be mutually incompatible in such a process. For instance, a paint system may have good durability properties such as hardness, toughness, weatherability and the like; but the same paint system may not have sufficient room temperature elongation to be applied smoothly over a complex shape by a pressure-sensitive adhesive. Some paint systems have sufficient elongation to permit application over a complex shape, but they are too soft and therefore lacking in the necessary hardness and/or durability properties.

In summary, there is a need for an economical production process for decorating contoured exterior car body members or panels with a paint coat having both the durability and appearance properties necessary for exterior automotive use. Techniques for applying a paint coat to such a part can provide a valuable alternative to conventional spray painting of exterior car body members. Capital costs also can be reduced and environmental problems can be alleviated. Applying such a paint film requires, however, a paint system and processing techniques capable of producing a finished film having a combination of good durability, elongation, opacity, gloss and DOI levels, and a defect-free surface. The present invention solves these problems.

SUMMARY OF THE INVENTION

Briefly, one embodiment of this invention provides a process for manufacturing a flexible film having a finished paint coat with exterior automotive quality durability, gloss, distinctness-of-image (DOI) and other appearance characteristics in the finished paint coat. In this process, the paint coat is applied to an exterior automotive panel by applying pressure to the film, which is bonded to the substrate by a pressure sensitive adhesive. The invention is described herein in the context of a paint coat applied to the surface of car body member or panel, but the invention is also applicable to other articles of manufacture having a paint coat with properties similar to those required for exterior automotive use.

Considering the application of the invention to a process for applying the film to an exterior car body panel, a paint coat comprising a synthetic resinous material is coated in thin-film form onto a flexible, heat-resistant temporary casting sheet. The paint coat is dried on the casting sheet sufficiently to transfer a predetermined exterior surface smoothness from the casting sheet to the paint coat. The paint coat may comprise a clear coat and a separate pigmented color coat, as well as a thin film-form intervening tie coat to bond the clear coat and the color coat. The color coat, in combination with the clear coat, provides a composite paint coat having the durability, gloss, DOI and other appearance properties necessary for exterior automotive use. The tie coat inhibits interlayer delamination between the clear coat and the color coat. A pressure sensitive adhesive is formed on a casting sheet in a separate coating and drying operation. The adhesive layer is then transfer-laminated to the color coat side of the composite paint coat. During the laminating process, the composite paint coat retains the durability, gloss, DOI and other appearance properties necessary for exterior automotive applications. The finished composite adhesive-backed paint film is capable of elongating sufficiently to conform to three-dimensionally contoured substrate panels without significant loss of exterior automotive appearance and durability properties, including weatherability.

In one embodiment, the clear coat portion of the paint coat comprises a blended fluorinated polymer and acrylic resin-containing paint system with thermoplastic properties. The relative amounts of the fluorinated polymer and acrylic resin components in the paint coat formulation provide a sufficient level of elongation for the film to be applied to complex three-dimensional shapes, in combination with a properly selected color coat, while providing sufficient durability and appearance properties for the finished film to be useful on an exterior car body panel.

In one form of the invention, the fluorinated polymer component comprises polyvinylidene fluoride (PVDF), and the acrylic resin component can be a polymethyl methacrylate resin, a polyethyl methacrylate resin, or mixtures thereof, including copolymers thereof. One finished product having a surface capable of exterior automotive use is made from a paint system comprising from about 50% to about 75% PVDF and from about 25% to about 50% acrylic resin, by weight of the total PVDF and acrylic solids.

Certain PVDF-acrylic clear coat formulations have good exterior appearance and durability properties, but room temperature elongation may not be at levels sufficient for the end-use of adhering smoothly to contoured surfaces. In one embodiment, it has been discovered that certain color coat formulations (in which the underlying color coat is bonded to the outer clear coat as described above) can enhance elongation of the overall composite paint film, including enhancing elongation of the PVDF-acrylic outer clear coat. One such color coat includes a chlorinated polymer-containing resin, such as polyvinyl chloride (PVC), which enhances elongation of the finished composite laminate without significant degradation of exterior automotive durability and appearance properties. In other cases the elongation-enhancing color coat can comprise a thermoplastic fluorinated polymer and acrylic resin-containing paint system, or an acrylic-based ink, or a paint coat containing polyurethane. Pigmented dispersions contained in the color coat also in some instances inhibit plasticizer migration which prevents intercoat adhesion failure. Use of certain plasticizers also inhibits plasticizer migration during use, which can inhibit volatile haze problems as well as preventing interlayer adhesion failure.

In a further embodiment, a first color coat comprising a fluorinated polymer and an acrylic resin can be bonded to the outer clear coat, while the tie coat bonds a second color coat comprising the chlorinated polymer to the first color coat. The elongation-enhancing second color coat provides enhanced elongation properties to the clear coat and the first color coat, and therefore, improves elongation of the finished laminate. The pigments contained in the first color coat can provide UV protection for the second color coat containing the chlorinated polymer. UV absorbers can be used in the second color coat. Interlayer delamination is prevented by such UV protection.

Thus, the present invention provides a process and articles of manufacture in which a paint coat ultimately forms an exterior finish on a contoured surface of an exterior car body panel, although the paint coat also is applicable to flat surfaces. During application to a contoured surface, the paint coat has sufficient elongation to retain the durability and appearance properties to be useful as a finished exterior paint coat for a car body panel.

These and other aspects of the invention will be more fully understood by referring to the following detailed description and the accompanying drawings.

DETAILED DESCRIPTION

Figure 1:
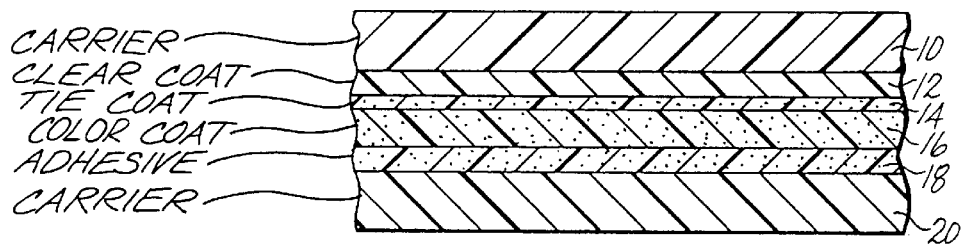
FIG. 1 is a schematic cross-sectional view illustrating one embodiment of a paint-coated composite laminate according to principles of this invention. Film thicknesses are exaggerated in size and not to scale, for simplicity.

A paint coat with a surface capable of exterior automotive use is applied to a molded plastic substrate panel by the processing steps described below. FIGS. 1 through 5 illustrate various embodiments of a dry paint transfer laminate used in the process of applying a finished exterior automotive paint coat to the substrate panel. FIG. 1 illustrates one embodiment of the invention which includes, in combination, a flexible, foldable, heat-resistant, self-supporting first carrier sheet 10, also referred to in the art as a casting sheet, and a transferable, adherent, flexible composite paint coat coated onto one surface of the first carrier sheet. The paint coat is a self-supporting, flexible synthetic resinous dry film-form coating. The paint coat can be formed in many embodiments described in FIGS. 1 through 5; but referring initially to the embodiment of FIG. 1, the composite paint coat includes a clear coat 12 coated on the carrier sheet 10 and dried; a tie coat 14 coated on the dried clear coat; and a color coat 16 coated on the dried tie coat, in which the intervening tie coat provides a means of bonding the color coat and the clear coat. A layer of pressure-sensitive adhesive 18 is adhered to the side of the color coat opposite from the clear coat; and a second flexible, foldable, heat-resistant, self-supporting carrier sheet 20 supports the adhesive layer 18. In one embodiment, the adhesive layer 18 is separately coated on the second carrier sheet 20 and dried, followed by laminating the adhesive 18 to the color coat 16. The outer carrier sheets 10 and 20 provide exterior protection for the composite paint coat and its adhesive layer in a manner similar to a removable backing sheet. The second carrier sheet 20 is silicone coated to provide release properties for the adhesive layer 18.

The carrier sheet 10 comprises a polyester casting film having a high gloss surface. The carrier can be a polyester film such as Mylar (a trademark of Du Pont), American Hoechst 3000 grade polyester film, more preferably Hoechst 3900 grade polyester film, or the like. The preferred film thickness of the carrier sheet is about 2–3 mils. Polyester films are preferred because the high gloss surface is capable of transferring a high gloss level to a surface of the clear coat 12 in contact with the carrier, where the transferred smoothness is sufficient for exterior automotive use. The polyester carrier film has a sufficiently high heat resistance to resist axial elongation under temperatures applied during subsequent paint coat drying steps. The clear coat may be applied to the polyester carrier film without a release coat on the high gloss surface of the carrier. The formulation of the clear coat is such that the clear coat can be easily transferred from the carrier sheet and can replicate the highly smooth surface of the carrier after the clear coat dries and after subsequent dry paint transfer steps in which the paint coat is released from the carrier, as described below. The carrier sheet 20 also comprises a polyester film similar to the polyester carrier sheet 10 except for the silicone coated release surface Lor the adhesive layer. The polyester carrier sheets 10 and 20 serve as removable protective outer backing sheets in the combination shown in FIG. 1. The polyester carrier sheets are critical for high distinctness-of-image (DOI) applications because they impart high DOI to the finished composite sheet. The clear coat cast on the carrier sheet 10 has a smooth surface from replicating the surface of the carrier. The adhesive coat also has a smooth surface when cast on a polyester carrier. These factors enhance DOI. Conventional backing sheets such as those made of paper stock can transfer surface non-uniformities to the paint coat and the adhesive and thereby reduce DOI.

As an optional step, a thin film of wax (not shown) can be coated on the first carrier sheet 10 and dried, followed by coating the clear coat over the thin film of wax. The wax is coated in a film thickness (less than 0.01 mil and preferably 0.001 mil) that avoids any adverse effect on the clear coat replicating the surface gloss of the carrier.

Clear Coat

The clear coat is a transparent or substantially transparent thermoplastic synthetic resinous coating composition coated in thin film form onto the surface of the carrier sheet in a liquid state. Heat is later applied to the clear coat to dry it, without cross-linking the resin, while the clear coat is on the carrier. The preferred dry film thickness of the clear coat is about 0.8 mil. to 1.4 mils. Preferably, the clear coat is coated onto the first carrier sheet 10 by a reverse roll coating process illustrated in FIG. 6, although the clear coat can be applied by other methods, rather than conventional coating or casting techniques. Referring to the reverse roll coating process of FIG. 6, the clear coat lacquer is contained in a coating pan 22 having a lacquer inlet 24 in the main portion of the pan, and a lacquer drain 26 on an opposite side of a weir 28. An applicator roll 30 rotates to pick up the lacquer from the pan and coat it onto a previously uncoated polyester film 10 which passes over a guide roll 32 and then passes between the applicator roll and a rubber back-up roll 34. A metering roll 36 adjacent the applicator roll 30 rotates in the same direction as the applicator roll. A doctor blade 38 wipes the surface of the metering roll to properly control the thickness of the coating on the applicator roll. The adjustable gap between the metering roll and the applicator roll controls the thickness of the coating on the surface of the applicator roll. The coating picked up by the applicator roll is then coated onto the polyester film 10 as the film passes into contact with the reverse-rotating applicator roll. The applied coating on the film is shown at 40. The coated film then passes to a drying oven.

The clear coat is dried at oven temperatures in the range from about 250° F. to about 400° F. Preferably, the clear coat is dried in multiple zones spaced apart along the long axis of the paint-coated carrier in line with the reverse roll coater. A preferred drying technique involves use of three heating zones with a progressively higher temperature applied in each successive zone. The solvent contained in the clear coat is essentially all driven off in the multistage drying process. The same multistage drying process is used for drying the tie coat 14, the color coat 16 and other coatings used in the various embodiments described below. The polyester carrier is resistant to heat at temperatures up to about 400° F. so that the carrier does not deform dimensionally during the drying step. The polyester carrier film thickness of about 2–3 mils assists the film in resisting elongation during drying. This ensures a high gloss level being replicated by the surface of the dried clear coat from the high gloss surface of the carrier. This also makes it possible to use high temperature resistant, high gloss paint systems which cannot be applied to and dried on plastic substrates directly because of temperature limitations of the plastic substrate materials.

The clear coat formulation produces a dry film-form exterior film which, in combination with the underlying color coat, produces a composite paint coat having properties useful as an exterior automotive paint coat. The properties of such an exterior automotive paint coat are described in PCT Publication WO 88/07416 generally from pages 20 through 23 of that publication. The disclosure of the entire PCT publication, Application PCT/US88/00991, dated Mar. 25 1988, is incorporated herein by this reference. The clear coat formulation produces a dry film-form exterior film which, in combination with the underlying color coat, produces a composite paint coat having properties useful as an exterior automotive paint coat. Such a paint coat is principally characterized by a combination of exterior automotive durability properties and gloss and other appearance properties of the finished paint coat. The specifications for a paint coat for exterior automotive use, as defined herein, include the mechanical properties of hardness; abrasion resistance; thermal stability, including heat resistance; resistance to gasoline and acids; cleanability; adhesion; certain weatherability properties such as UV resistance and resistance to water and humidity exposure; and impact strength. For simplicity, these properties are referred to collectively herein as "durability properties."

Weatherability, which is measured, in part, by UV resistance properties, is a durability property commonly used in the art to define standards for an exterior automotive paint coat. To measure UV resistance can require long-term exposure testing of the paint coat, for a period of two years in one test method. Certain long-term UV tests of the paint coat of this invention have not been completed to date, but other short-term accelerated UV resistance and weatherability tests of the paint coat have been completed and are described below.

In addition to durability properties, the specifications for an exterior automotive quality paint coat also include tests to measure the visual appearance qualities of the finished surface. These criteria include gloss, distinctiveness-of-image (DOI), dry film thickness and hiding ability or opacity of the paint coat. These properties are referred to collectively herein as "gloss and other appearance properties."

Thus, a paint coat can have a combination of predetermined physical properties that collectively define whether the paint coat is capable of use as an exterior automotive paint finish. Generally, the paint coat of this invention, in dry film-form, provides a combination of the above-described durability and appearance properties, including gloss, which enables the paint coat to function as an exterior automotive paint coat.

The criteria used to define whether a paint coat is sufficient for exterior automotive use are not uniform throughout the automobile industry. Certain standards can vary from one auto manufacturer to the next, and from one car model to the next for a given auto manufacturer. Most criteria used to define an exterior automotive quality surface for the process of this invention have been adopted from specifications and test methods used in certain General Motors Fiero and Pontiac Grand AM test programs. These criteria are disclosed herein as an example of techniques that can be used to measure whether a paint coat has sufficient properties for exterior automotive use, although other combinations of test criteria and test methods can also be used for this purpose. The specifications and test methods for measuring the properties of the exterior automotive paint coat of this invention are described in detail below.

In addition to the properties of durability and appearance, the clear coat formulation also imparts to the composite paint coat sufficient elongation at thermoforming temperatures to enable the paint coat to be thermoformed into complex three-dimensional shapes without deglossing of the clear coat and without reducing any durability property below that required for an exterior automotive surface. In one embodiment, the paint coat is thermoformed at temperatures from about 280° F. to about 450° F. A laminate having the clear coat as its exterior surface is capable of being thermoformed at these temperatures while maintaining the durability and appearance properties of the composite paint coat. Elongation of the paint coat can be substantial when forming the complex three-dimensional shapes of the finished article. Elongation of the clear coat (and the composite paint coat) can be greater than about 50%, and often greater than 100%, to form a highly contoured finished article. Plastic car body members and panels often require such deep draw forming. The clear coat also is capable of maintaining the durability and appearance properties of the paint coat during a subsequent injection molding step.

In one embodiment, the clear coat 12 comprises a blend of a thermoplastic fluorinated polymer and an acrylic resin. The clear coat preferably contains the fluorinated polymer and acrylic resin as its principal components. The fluorinated polymer component is preferably a thermoplastic fluorocarbon such as polyvinylidene fluoride (PVDF). The fluorinated polymer also can include copolymers and terpolymers of vinylidene fluoride. The thermoplastic fluorocarbon useful in the clear coat is the polyvinylidene fluoride known as Kynar, a trademark of Pennwalt Corp. This polymer is a high molecular weight (400,000) polymer which provides a useful blend of durability and chemical resistance properties. Generally, a high molecular weight PVDF resin, with a weight average molecular weight of about 200,000 to about 600,000 is used.

The acrylic resin component of the clear coat can be a polymethyl methacrylate, or a polyethyl methacrylate resin, or mixtures thereof, including methacrylate copolymer resins, acrylate resins, and minor amounts of other comonomers. The clear coat also can include minor amounts of block copolymers and/or compatibilizers to stabilize the blended PVDF and acrylic resin system and provide compatibility between films.

In one embodiment, a principal component of the acrylic resin contained in the clear coat is a medium molecular weight polymethyl methacrylate resin such as Elvacite 2010, a trademark of Du Pont. (In all further references to Elvacite resins herein, it should be noted that Elvacite is a trademark of Du Pont for a group of its acrylic resins.) In another embodiment, a principal component of the acrylic resin for the clear coat can be a high molecular weight polyethyl methacrylate resin such as Elvacite 2042. The acrylic component of the clear coat also can comprise a mixture of Elvacite 2010 and a medium-to-high molecular weight polymethyl methacrylate resin such as Elvacite 2021. In a further embodiment, the acrylic resin component can comprise Elvacite 2042 and a low molecular weight polyethyl methacrylate resin such as Elvacite 2043. Other similar combinations of acrylic resins, their homopolymers and copolymers, may be used as a component of the clear coat. Generally, the acrylic resin component has a relatively high weight average molecular weight of about 50,000 to about 400,000.

The PVDF and acrylic-based clear coat formulation can be prepared as a solution of PVDF and acrylic resin in solvent. Experimental tests of finished car body panels, in which the paint coat has been prepared from a solution of PVDF in acrylic resin, have demonstrated high levels of gloss and DOI.

The PVDF and acrylic-based clear coat formulation also can be prepared as a dispersion of the PVDF in a solution of the acrylic resin. In one embodiment, the clear coat formulation can be prepared by mixing the acrylic resin with a suitable organic solvent and applying heat to dissolve the resin. The mixture is then allowed to cool sufficiently before adding the PVDF component so that the PVDF will not dissolve, but will be maintained as a dispersion in the acrylic-solvent based mixture. By maintaining the PVDF component as a dispersion in the clear coat, solvent evaporation during drying of the clear coat can be improved.

A preferred composition of the dried clear coat comprises from about 50% to about 75% PVDF, and from about 25% to about 50% acrylic resin, by weight. In some instances, the maximum content of the PVDF component is about 72%, with the balance essentially comprising the acrylic resin. These solids ranges are based on the relative proportions of the PVDF and acrylic components only in the clear coat formulation. Other minor amounts of solids, such as UV stabilizers, block copolymers and compatibilizers also may be contained in the clear coat formulation.

In one embodiment, a successful experimental car body panel having exterior automotive surface properties was coated with a paint system in which the dried clear coat consisted essentially of about 65% PVDF and about 35% polyethyl methacrylate resin, by weight. This clear coat provided high gloss and good exterior automotive properties of appearance and durability. In another successful experimental car body panel having good exterior automotive appearance and durability properties, including gloss, the dried clear coat consisted essentially of about 72% PVDF and about 28% polyethyl methacrylate resin, by weight.

The acrylic resin component of the clear coat is desirable because of its compatibility with the PVDF in dry film form. The acrylic resin is also added in an amount that yields a transparent clear coat in dry film form. Generally speaking, transparency and DOI of the composite paint coat increase in proportion to the amount of acrylic resin added to the PVDF-acrylic system. It has been determined that a pure PVDF clear coat has reasonably good properties of durability and elongation, but such a 100% PVDF coating is not normally transparent. When sufficient acrylic resin is added to the PVDF component, the resulting clear coat becomes reasonably transparent. Increased transparency of the clear coat improves the gloss level of the finished clear coat. The acrylic resin is also combined with the PVDF in an amount that maintains sufficient elongation to allow the clear coat (and the color coat to which it is bonded) to be applied (as part of the construction described below) to complex three-dimensional shapes, while retaining the exterior automotive durability properties and appearance properties, including gloss and DOI, of the finished paint coat. It has been determined that a dry film-form PVDF-acrylic-based clear coat containing about 28–35% acrylic resin and about 65% to 72% PVDF, by weight of the total PVDF and acrylic solids, will yield sufficient elongation.

The PVDF component of the clear coat is desirable because of the exterior automotive durability properties it provides in the resulting clear coat, particularly in combination with the acrylic resin component. Elongation at room temperatures is within desired levels, when the PVDF-acrylic clear coat is combined with a color coat having elongation-enhancing properties as described below. The PVDF component also provides good weatherability properties in the finished paint coat. It has been determined that a pure thermoplastic acrylic resin clear coat can provide good hardness or toughness characteristics, but it lacks weatherability. A cross-linked thermoset acrylic resin commonly used as an exterior auto paint is not useful in the process of this invention. When elongated, it shatters or cracks. A dry film-form PVDF and acrylic resin-containing clear coat having from about 25% to about 50% acrylic resin (by weight of the total PVDF-acrylic-based solids) has sufficient elongation to allow proper application, while maintaining the exterior automotive durability, gloss and DOI, and other appearance properties of the finished composite paint coat.

It is possible to produce low DOI products both with and without the PVDF-acrylic outer clear coat. For instance, a pigmented PVDF-acrylic outer color coat can be used in the finished product, but it will have a lower gloss and DOI and generally a dull appearance. The PVDF-acrylic outer clear coat is necessary where exterior automotive quality high gloss and DOI and good appearance are necessary.

Tie Coat

An acrylic-based tie coat 14 bonds the color coat 16 to the clear coat 12. The tie coat is applied by coating it directly to the clear coat by a reverse roll coat or gravure printing process. The preferred film thickness of the tie coat is about 0.1 to 0.4 mil. The tie coat is essentially transparent so that the color coat 16 is visible through the clear coat 12 and the underlying tie coat 14. The tie coat provides a critical function of enhancing interlayer bonding between the clear coat 12 and the color coat 16, where the clear coat and color coat are comprised of different polymers. The tie coat also is used for interlayer bonding of two color coats comprised of different polymers, as with a further embodiment described below. The tie coat formulation also is described in the examples to follow.

Color Coat

Figure 6:
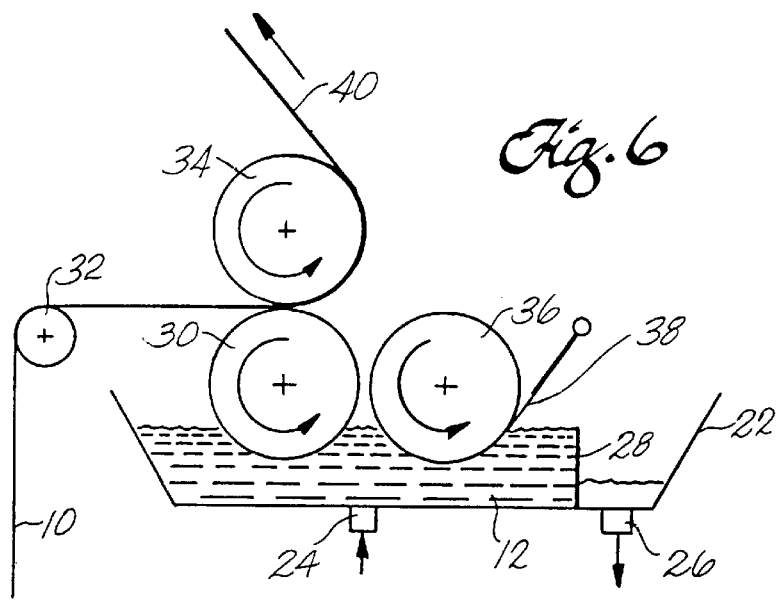
FIG. 6 is a schematic cross-sectional view illustrating a paint-coating step in the process of forming the paint-coated laminates of this invention.

The color coat 16 is preferably applied by reverse roller coating techniques similar to those illustrated in FIG. 6. A preferred dry film thickness of the color coat 16 is in the range of about 1.5 to about 2.5 mils. The color coat comprises a flexible synthetic resinous coating composition containing a sufficient amount of uniformly dispersed pigment to provide the appearance necessary for exterior automotive use. More specifically, the color coat contains an amount of dispersed pigment such that the composite paint coat maintains opacity and high DOI throughout the application step so as to ultimately provide a finished paint coat with exterior automotive properties. The resinous material contained in the color coat functions in combination with the clear coat to produce the required exterior automotive surface for the finished paint coat. That is, although the clear coat provides the exterior surface portion of the finished paint coat, the exterior automotive properties of the finished paint coat are not controlled solely by the clear coat formulation. The underlying color coat can affect DOI and durability properties of the finished paint coat, for example. Abrasion resistance is an example of a mechanical property enhanced by a tougher color coat in combination with the exterior clear coat. Weatherability of the finished paint coat also is influenced by the color coat formulation as well as the clear coat. The color coat also comprises a thermoplastic resinous material which is capable of elongation at application temperatures (typically room temperatures) while not significantly disrupting the exterior automotive properties of the finished paint coat. The color coat can enhance elongation of the clear coat and therefore improve overall elongation of the finished paint-coated composite laminate, as described below.

The color coat is preferably dried by passing it through the same multiple heating zones used in drying the clear coat. Drying temperatures in each of the zones are progressively increased and are at slightly higher temperatures than those used for drying the clear coat. The color coat is preferably cast directly on the tie coat, as opposed to forming the color coat as a separate film and then laminating it to the tie coat. This has been found to enhance interlayer bonding and thereby inhibit delamination during use. The color coat composition is preferably a synthetic resinous coating composition having thermoplastic properties similar to the clear coat. Although the color coat alone does not necessarily require all of the exterior automotive properties of durability and appearance, in order to produce a useful composite paint coat, a color coat composition (exclusive of the pigment contained in the coating) having most of the desirable exterior automotive durability properties is preferred.

In the embodiment illustrated in FIG. 1, the color coat 16 provides the function of enhancing elongation of the finished laminate. To achieve this function, the color coat contains a thermoplastic chlorinated polymer, preferably polyvinyl chloride (PVC). Such a PVC-containing color coat has been found useful as a means of improving room temperature elongation of the finished paint-coated composite laminate. In particular, it enhances elongation when used in combination with the PVDF-acrylic outer clear coat, or when used in combination with an overlying PVDF-acrylic color coat. On the other hand, use of a PVC-containing polymer for an exterior automotive composite paint coat can have UV and heat resistance problems. To avoid these problems, the PVC-containing color coat is not used as an exterior coat, but rather an underlying film bonded to the overlying PVDF-acrylic coat or coats. The flexibility-enhancing formulation of the color coat 16 can be prepared by mixing the chlorinated component, along with various additives, such as plasticizers and heat and light stabilizers, in suitable organic solvents. The preferred chlorinated polymer component for the color coat is a polyvinyl chloride homopolymer resin such as Geon 199, a trademark of B. F. Goodrich Chemical Co. The resin component can include a minor percentage of an acrylic component. Suitable organic solvents include a non-polar solvent comprising an aromatic petroleum distillate such as Hi-Sol 10, a trademark of Ashland Chemical Co.

The plasticizers contained in the thermoplastic chlorinated polymer formulation enhance elongation and flexibility properties of the color coat. The particular plasticizers used in the formulation are those that avoid significant migration during use. Such plasticizer migration can cause interlayer delamination and volatile haze problems in the finished product. Use of certain high molecular weight plasticizers have been found to inhibit plasticizer migration. Plasticizers with a molecular weight greater than about 7,000 can produce good plasticizer permanence. In one embodiment, a plasticizer comprising polyester azelates (propylene glycol azelaic acids) having a molecular weight of 7,080 produced good migration resistance and good resistance to volatile haze and interlayer delamination problems, as demonstrated in the examples to follow.

The color coat may contain a substantial pigment level in order to provide sufficient opacity to maintain desirable coloration in the finished article. In a highly contoured three dimensionally shaped article, a large amount of pigment may be necessary for hiding, following subsequent application steps. For most colors, a pigment level from about 2% to about 30%, by weight of the solids contained in the coating produces the desired opacity in the finished paint coat. The amount of pigment used varies depending upon the color. For a white color coat used over an experimental car body panel, for example, a pigment level of about 30%, by weight of the total solids, was used. For a black color coat using carbon black pigment applied over an experimental car body panel, about 2% pigment was used.

The pigment contained in the color coat can affect exterior automotive properties. For instance, different pigments, even of the same color, can vary widely with respect to their resistance to weathering, particularly UV weatherability. The pigments dispersed in the color coat may retain the plasticizer and, thereby, may prevent plasticizer migration which can cause intercoat adhesion and volatile haze problems. The PVC-containing color coat has produced good results in terms of heat and light resistance and weatherability of the finished paint coat.

The high pigment level in the color coat also can affect mechanical properties of the coating, such as durability and elongation. Elongation properties also should not be adversely affected by added pigments or stabilizers.

Thus, the desired color coat formulation provides the appearance and durability properties which, in combination with the clear coat, produce a composite paint coat having the properties suitable for exterior automotive use. These include high gloss, DOI and weatherability. The color coat enhances elongation of the combined clear coat and color coat while durability and appearance properties, including gloss and DOI, of the finished paint coat are not degraded. During use, the paint coat can be subjected to elongation in order to conform to three-dimensionally contoured surfaces. Such elongation of the finished laminate can be achieved without disruption of the necessary exterior automotive properties even under extremes of heat, cold and humidity. For instance, tests have shown that the finished product comprising the laminate shown in FIG. 1 can undergo elongation in a range of about 50% to about 150% greater than its original dimension with no noticeable color change (for certain pigment dispersions) and suitable retention of most appearance properties such as color, gloss and DOI. In one embodiment, a construction was made from a color coat having PVC in the range of about 35% to about 50% of the total solids contained in the color coat formulation (including the pigment). This construction produced a finished paint coat having durability and appearance properties, including high gloss and DOI, sufficient for exterior automotive use following application as a pressure-sensitive adhesive-backed decorative sheet to a contoured surface.

As an alternative to the PVC component, the color coat also can contain other resin formulations. A flexible acrylic or urethane resin with good room temperature elongation properties also may be useful as a color coat formulation. In addition, the PVC-containing color coat may be used in combination with one or more overlying pigmented paint coat layers of different resin formulations. As one example, the pigmented chlorinated polymer color coat can be one of several color coats in a finished laminate. It can be used with one or more overlying color coats containing a blended fluorinated polymer and acrylic resin. In this instance, the tie coat bonds the pigmented chlorinated polymer color coat to the adjacent color coat of a different polymer. The combined color coats work in combination to enhance coloration and opacity of the finished product. The chlorinated polymer color coat enhances flexibility of the finished paint coat laminate.

Figure 2:
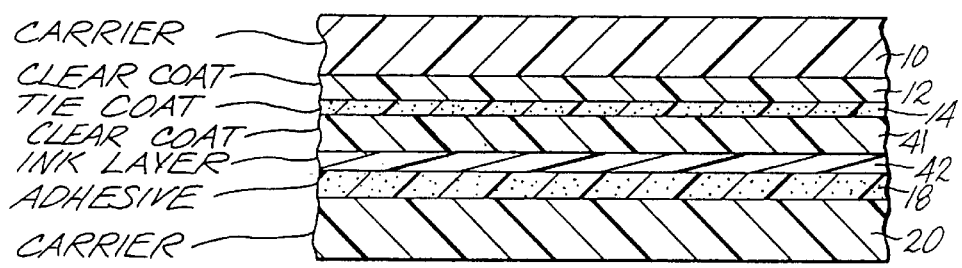
FIGS. 2–5 are further schematic cross-sectional views illustrating various embodiments of the paint-coated laminate.

Although the paint coat has thus far been described in relation to a clear coat and a separate color coat, the composite paint coat of this invention also may be produced with the color coat being replaced with another clear coat containing the chlorinated component, along with the plasticizers and heat and light stabilizers mentioned above. For instance, FIG. 2 illustrates an alternative embodiment in which a PVC-containing clear coat 41 is substituted for a color coat as described above. In this embodiment, one or more separate optional ink layers 42 bonded to the second clear coat 41 can provide the necessary coloration and opacity. The ink layers suitable for use in this invention are described in more detail below.

Pressure-Sensitive Adhesive Coat

Referring again to FIG. 1, the adhesive layer 18 is next laminated to the dried color coat. The adhesive layer is coated on the second carrier sheet 20 and dried on the carrier before laminating the dried adhesive coat to the color coat. The adhesive coat is dried in ovens similar to those used to dry the clear coat and color coat, but at much lower temperatures. The adhesive coat bonds the paint coat to the exterior automotive substrate in the application step described below. The adhesive coat preferably comprises an acrylic-based synthetic resinous material which is activated from pressure applied during the subsequent application step to bond the paint coat to the exterior automotive substrate. The preferred dry film thickness of the adhesive coat is from about one mil to about 1.5 mils.

The pressure sensitive adhesive is preferably cast on a smooth surfaced polyester casting sheet in a separate operation. The adhesive coat is dried to produce a smooth surface. The adhesive coat is then laminated to the PVC color coat side of the paint layer composite to provide the adhesive backing. Any surface roughness of the adhesive coat can be reflected through the top coat of the finished paint coated laminate, thereby reducing DOI of the finished product. Casting the adhesive in a separate step on a smooth polyester carrier produces a sufficiently smooth surface that DOI of the finished product is not significantly affected when laminating the pressure-sensitive adhesive to the paint coated laminated. The adhesive coat is not cast directly on the dried PVC coat to avoid the adhesive solvents from attacking the PVC coat.

Application Procedures

For vehicle preparation, all areas of the car body panel are thoroughly washed to remove all factory applied protective coatings. Surfaces must be smooth and free from paint defects such as pits, paint nibs, dirt, sags, and rough two-tone paint break lines. These defects are removed by sanding, and using 360 or 400 grit wet or dry sandpaper. Such defects can telescope through the film if not removed.

The cleaning procedure involves using a clean, lint-free cloth to wipe the areas with naphtha cleaner. Next, a second clean, lint-free cloth, is used to wipe the areas with isopropanol. Then, using a third clean, lint-free cloth, the entire area is dry-wiped. The film should be applied as soon as reasonably possible after the dry-wipe step to avoid additional contamination.

Temperature effects can have a profound effect on application properties. Film application is most easily made when air, film and body surface temperatures are between 21° C. and 32° C. For applications below 21° C., heat lamps or other suitable means are used to warm the body surface and film. The body surface must be allowed to cool if above 32° C. The film should not be applied when the film and surface temperature are below 15° C.

Tools and equipment include plastic squeegee (both with and without a felt oversleeve), spray bottle, air release tool or pin, razor blades, heat gun, clean, lint-free cloths, heaters, naphtha, isopropanol, detergent or surfactant, and 360 and 400 grit wet/dry sandpaper.

Since contamination can be visible in the film application, the working area should be draft free and free from dust or dirt. Lighting should be bright enough to clearly reveal all vehicle contour lines without shadowing, especially in the lower body area. Heat lamps should be available when lower temperatures are expected.

The first step in the application procedure is removal of the polyester carrier or liner 20 covering the adhesive layer 18. During the liner removal step, the film is placed on a clean, flat surface with the liner side up. The liner is removed in a smooth, 180° motion. It is mandatory to remove the liner from the film, and not vice versa, since removing the film from the liner can cause film stretching.

After the liner has been removed, the adhesive side of the film and the car body surface are moistened with a solution of 2.5 ml of detergent or surfactant per liter of deionized water. More detergent or surfactant may be added if temperature and humidity are high. Wetting the surface in this manner temporarily lowers the aggressiveness of the adhesive, which facilitates positioning of the film and later removal of any air bubbles or wrinkles. The film is next aligned to the proper location on the car body panel. Starting in the center and working outward, a squeegee is used to pressurize the film to the surface with firm, overlapping strokes, making sure accurate alignment is maintained. Squeegeeing is repeated until all water and air are removed from beneath the film and proper edge bonding is ensured.

The first carrier sheet 10 has been replaced by a pre-mask which is removed by pulling it back over itself in a smooth, steady motion at a 180° angle. (In some instances the first carrier sheet can be left in place in which case the pre-mask is not used.) The applied film is inspected for air bubbles which are pierced with an air release tool or pin. The squeegee is used to force air and water out through the pierced hole. If trimming the film is necessary, a sharp razor blade with a back-up template are used to prevent damage to any painted areas. The entire surface of the film is examined for manufacturing flaws, wrinkles, or misalignment. The entire surface of the film is resqueegeed, using the squeegee with a felt oversleeve, to ensure that all edges have received adequate pressure to prevent tape peeling.

Characteristics of Finished Paint Coat

The following are physical properties used herein to measure whether the finished paint coat is useful as an exterior automotive paint coat:

(1) Gloss
(2) Distinctness-of-Image
(3) Color Uniformity (hiding ability)
(4) Dry Film Thickness Uniformity
(5) Gasoline Resistance
(6) Solvent Resistance
(7) Acid Spotting Resistance
(8) Hardness
(9) Abrasion Resistance
(10) Adhesion of Paint Coat
(11) Accelerated UV Resistance
(12) Resistance to Water and Humidity Exposure
(13) Intercoat Adhesion
(14) Peel Adhesion
(15) Tensile Strength and Elongation
(16) Volatile Haze Properties (1) through (4) are considered appearance properties and properties (5) through (15) are considered durability properties. Specifications and tests methods for each of these physical properties are described below. Certain specifications and test methods identified below are defined by publicly available industry specifications and test methods which are incorporated herein by this reference.

(1) Gloss is measured by specular reflectance of a beam of light at angles of 20, 60, and 85 degrees. The desired specular reflectance for an exterior automotive paint coat surface is at least about 60 to 65 gloss units at 20 degrees, and at least about 75 to 80 gloss units at 60 degrees. The 85 degree gloss reading may be used for low gloss measurements. Specular reflectance and other criteria herein are measured before the finished painted surface is buffed and waxed. A preferred test method is described in GM Test Specification TM-204-A. The Byk-Mallinckrodt "multi-gloss" or "single gloss" gloss meters can be used for measuring specular gloss of the finished surface. Those gloss meters give values equivalent to those obtained from ASTM Method D-523–57. Either gloss meter is used with gloss standards covering the expected range of measurement, together with a piece of polished black glass plate of known refractive index. The gloss meter is calibrated by setting it to read the gloss of a highly polished standard and then reading the gloss of a working standard having a value preferably in the range of the test panel. The second standard should agree within one unit of its assigned value. At least two readings are taken on a different area of the test panel. These values are averaged if they agree within one unit. If the range is larger than one unit, additional regions are taken and a mean value is calculated.

(2) Distinctness-of-Image (DOI) is a measurement of the clarity of an image reflected by the finished surface. DOI can be measured from the angle of reflection of a light beam from a spherical surface. The desired DOI for an exterior automotive paint coat surface is at least about 60 units, where 100 units is the maximum DOI reading. DOI is measured by the Hunterlab Model No. D47R-6F Dorigon Gloss Meter. A test panel is placed on the instrument sensor and the sharpness of the reflected image is measured. Details of the DOI test procedure are described in GM Test Specification TM-204-M, which are incorporated herein by reference.

(3) Color uniformity is a test to determine whether coloration of the paint coat remains uniform after application. Coloration is tested after the paint coat is coated on the casting sheet. Coloration testing is repeated after a deep draw stretch simulating elongation during application, to determine whether the color has changed. A desirable coloration uniformity can be a color change of no greater than about one to two McAdam units on a calorimeter.

(4) Dry Film Thickness (DFT) is a standard industry measurement of the film thickness of the finished paint coat, to determine whether the paint coat thickness matches a required film thickness specified by the auto manufacturer. For the present exterior automotive specifications, uniformity of the finished paint coat is determined to be a more useful parameter in determining whether the paint coat meets appearance requirements. Thickness uniformity of the finished paint coat can be measured from several locations on the finished article, including highly contoured areas, to determine whether variations in the thickness of the finished paint coat exceed a desired level.

(5) Gasoline Resistance requires no color change, degradation, tackiness, marring or loss of paint adhesion on plastic parts used on and adjacent to fuel filler openings after being immersed for ten seconds, ten times, in a specified reference fuel with a 20 second dry off period between each immersion. Immediately after the tenth immersion, the painted surface is checked and must pass Thumbnail Hardness according to GM Test Specification TM 55-6, incorporated herein by reference.

(6) Cleanability is tested according to GM Test Specification TM 31-11 which is incorporated herein by reference. According to this test, the painted plastic part is required to withstand ten rubs with cheesecloth saturated with 9981062 Naphtha or currently used and approved cleaning solvents, with no evidence of staining, discoloration, or softening of the painted surface. This test requires no evidence of color transfer from the test part of the cloth. One rub consists of one forward and backward motion.

(7) Acid Spotting Resistance requires the test part to withstand exposure to 0.1 N sulfuric acid for 16 hours without any evidence of staining, discoloration, or softening of the painted surface.

(8) Hardness is measured by a standard Knoop Hardness Test. The required hardness is at least a Knoop hardness number of four.

(9) Abrasion Resistance is tested by a gravelometer under the standard test method identified as SAE J-400. According to this test, the painted part shall withstand the Gravelometer Test at minus 30° F. with a minimum rating of eight (F.B. Gravelometer Rating Chart). The tested part should withstand the Gravelometer Test as received and after Florida exposure described below. A Fisher Body Material Specification FBMS 26-7 (incorporated herein by reference) also defines a minimum level of wear resistance for the finished paint coat.

(10) Paint adhesion is tested by a standard Tape Adhesion Test described in GM Test Specification TM 55-3, which is incorporated herein by reference. According to this test, a tape is pressed down over an X-shaped cut in the paint coat and the tape is then removed to test the amount of peeling. The Adhesion Test requires a minimum of 99% of the paint remaining in the tape test area.

(11) Accelerated UV Resistance, also referred to as Accelerated Weathering, measures the weatherability of a paint coat in accelerated test procedures designed to provide an accurate indication of long-term UV resistance or other weatherability properties. The two methods used to measure accelerated UV resistance are QUV and Xenon Weatherometer. According to a QUV test useful for measuring accelerated UV resistance, the test panel should not show any significant surface deterioration or embrittlement, loss of coating adhesion, objectionable shrinkage, or noticeable color or gloss change after about 2000 hours exposure to UV light and condensation apparatus per ASTM G-53 using eight hour UV cycle at 70° C. and four hour humidity cycle at 50° C. A panel tested in the Xenon Weatherometer should exhibit the same characteristics as a panel that successfully passes the QUV test. The xenon specification used was SAE J1960, with 2500 hours as the exposure period.

(12) Resistance to Water and Humidity Exposure is measured by several tests. According to a first test, the finished part shall withstand 96 hours of humidity exposure at 100% relative humidity and 100° F. in a humidity cabinet defined in GM Test Specification TM 55-3, and a two-hour water immersion test of 100° F. according to GM Test Specification TM 55-12. These test specifications are incorporated herein by reference. The resulting test panel should show no evidence of blistering when examined one minute after removal from the test cabinet and shall withstand the Paint Adhesion Test described above. The Paint Adhesion Test is performed within one minute after removal from either test cabinet. In a second test, the finished part should withstand 15 cycles of the Moisture-Cold Cycle Test defined in GM Test Specification TM 45-61A (incorporated herein by reference), without any visible signs of cracking or blistering. After 15 cycles, the part shall withstand 96 hours of the humidity exposure described above, followed by passing the Paint Adhesion Test also described above. The Paint Adhesion Test is performed within one minute after removal from the humidity environment. One cycle consists of 24 hours and 100% relative humidity at 100° F., 20 hours at minus 10° F., and four hours at room temperature.

(13) Intercoat Adhesion is tested in the same manner as in (10), except that the bond between the clear coat and color coat is being gauged, instead of the adhesive bond to the automotive substrate. In this test, the GM Test Specification TM 55-3 is again used, except that the cut made is only down to the surface of the color coat, not all the way through to the substrate. Tape is pressed down over the X-shaped cut and the tape is then removed to test the amount of film anchorage. If the paint coat passes this initial test, it is placed in a water bath at 70° C. The paint coat is then removed periodically from the water bath (usually every day), allowed to dry, and the tape test is repeated. The test is considered a failure when the clear coat separates from the color coat.

(14) Peel Adhesion is a test used to measure the strength of the adhesive bond between the paint coat and the automotive substrate. The test is performed according to the ASTM D3330 specification. Usually peel adhesions are measured initially (immediately after application), and after a variety of exposure conditions, such as humidity, salt spray, environmental paint cycles, and QUV.

(15) Tensile Strength and Elongation are tests used to: (1) Measure the force required to stretch a sample of the paint coat until it breaks, and (2) Measure how much the film has elongated at the instant it breaks. The tests are run according to the ASTM D3759 specification. Tensile Strength and Elongation are usually run initially and after various exposure conditions, especially heat aging. These two tests measure properties that are very important in the application of the paint coat, since the paint coat must have enough strength to prevent breakage when it is elongated, and must have sufficient elongation to be stretched for application to complex three-dimensional shapes.

(16) Volatile Haze is a non-standard test which the applicant uses to measure the presence of components, especially plasticizers, which migrate to the surface of the film during a heat test. This heat test involves placing test panels in an 80° C. air circulating oven for a period of two weeks. During this time, the test panels are removed from the oven daily and inspected for haze; the haze usually appears as a white substance which can be wiped off the surface of the film. Besides the visual inspection, haze can also be detected by measuring the gloss of the film, as described in Gloss Test (1) described above. A gloss decrease of greater than 25% over the two week period is an indication that haze is present. If gloss decrease measures greater than 25%, the result is considered a test failure.

EXAMPLE 1

A high gloss black exterior automotive paint coat was applied to the exterior surface of an automobile body panel. The panel was a sheet metal body panel having a flat outer surface. The paint coat was first coated onto a surface of a flexible polyester film casting sheet. The flexible carrier comprised two mil thick high gloss Hoechst Celanese 3900 polyester film. The paint coat comprised a clear coat, a tie coat, a color coat and an adhesive coat, in that order, similar to the construction shown in FIG. 1.

The clear coat was prepared from the following formulation:

| Ingredient | Parts |
| --- | --- |
| N-Methyl-2-pyrrolidone (M-Pyrol) | 54.00 |
| Polyethyl Methacrylate (Elvacite 2042) | 6.30 |
| PVDF (Kynar 301F) | 11.70 |
| UV Absorber (Tinuvin 234) | 0.36 |
| Methyl Ethyl Ketone (MEK) | 27.64 |

The M-Pyrol is a solvent available from GAF Corp. Tinuvin is a trademark for a family of UV absorbers available from Ciba-Geigy Corp. The Kynar and Elvacite resins are described above.

The PVDF, acrylic resin and UV absorber were dissolved. The Elvacite 2042, Kynar 301F, and Tinuvin 234 were dissolved in the M-Pyrol under high speed agitation. The mixture was allowed to heat to no greater than 130° F., then allowed to cool before the MEK solvent was added. The viscosity was adjusted to 1100 centipoise, using M-Pyrol as the thinner.

The clear coat was coated on the polyester casting sheet in a dry film thickness of about 0.8 mil. The clear coat was applied to the sheet by a reverse roll coater (illustrated in FIG. 6). The clear coat was dried on the carrier sheet by passing it through a multi-zone impinging air drying oven having three heating zones spaced apart axially along the length of the carrier, with each drying zone having a progressively higher temperature. The clear-coated carrier was passed through the heating zones at a line speed of 25 feet per minute and each heating zone was 40 feet long. Temperatures of the three heating zones were: Zone 1: 240° F., Zone 2: 300° F., Zone 3: 350° F. Passing the clear coat through the three heating zones removed substantially all solvent gases from the clear coat to produce a dry clear coat of uniform film thickness. The dried clear coat comprised approximately 65% PVDF and approximately 35% acrylic resin, by weight of the total PVDF and acrylic solids.

A clear acrylic-based tie coat was next coated on the dried clear coat at a dry film thickness of about 0.1 mil. The tie coat formulation was as follows:

| Ingredient | Parts |
| --- | --- |
| Toluene | 40.00 |
| N-Propyl Acetate | 39.70 |
| UV Absorber (Tinuvin 234) | 0.39 |
| Polyethyl Methacrylate (Elvacite 2042) | 20.00 |

The Tinuvin 234 and Elvacite 2042 were dissolved in the toluene and N-Propyl Acetate under high speed agitation. The viscosity was adjusted to 300 cps using toluene as the thinner.

The tie coat was applied to the dried clear coat on the casting sheet by means of a 137 HK gravure cylinder, at a line speed of 100 feet per minute. The tie coat was passed through one oven zone at 200° F.

The color coat was then prepared from the following

| Ingredient | Parts |
|---|---|
| Aromatic Solvent (Hi-Sol 10) | 19.39 |
| 2-Ethyl Hexyl Acetate | 6.46 |
| UV Absorber (UV 531) | 1.96 |
| BaZn Heat Stabilizer (MX 2181) | 2.93 |
| Epoxy Heat Stabilizer (TC909) | 1.93 |
| Acrylic Copolymer (B 99) | 2.44 |
| Plasticizer (C.P. Hall G-59) | 3.91 |
| Polyvinyl Chloride (Geon 199) | 48.82 |
| Black Dispersion | 12.14 |

The Hi-Sol 10 is an aromatic petroleum distillate, available from Ashland Chemical Co. The black dispersion comprised 15% carbon black pigment and 35% Hi-Sol 10 in a vehicle of Emery 9776, available commercially as Universal Color Dispersions UCD-26776. The acrylic copolymer comprised 50% acrylic resin, 35% xylene and 15% toluene and is available as product no. B 99 from Rohm and Haas. The epoxy heat stabilizer is a proprietary epoxy resin, product name Therm-Chek 909, available from Ferro Corporation. The BaZn heat stabilizer is an organo barium zinc heat stabilizer, product name Mark 2181, available from Witco Corp. The UV absorber has a product name Cyasorb UV 531, available from Cyanimid Corp. The plasticizer is a poly (1, 2-propylene glycol adipate)-polymeric plasticizer, product no. G-59, available from C. P. Hall Corp.

The color coat was prepared by first mixing the Hi-Sol 10 and 2-Ethyl hexyl acetate. Next, the UV 531, MK 2181, TC 909, B 99, and the plasticizer were added under low agitation. The Geon 199 was then added under high agitation and mixed until it was observed that no solid particles remained in the solution. The black dispersion was then added under low agitation. On a weight basis, the amount of pigment contained in the color coat formulation was about 1.2%. The total solids of the wet solution was 71.8%.

The black PVC-based color coat was coated on the dried tie coat layer to a dry film thickness of about 2.2 mils. The color coat was applied to the sheet by the same reverse roll coater that was used for the clear coat. The line speed was 25 feet per minute. Temperatures of the three heating zones were: Zone 1: 160° F., Zone 2: 270° F., Zone 3: 360° F. Passing the color coat through the three heating zones removed substantially all the solvent to produce a dry coat of uniform film thickness.

The acrylic-based pressure sensitive adhesive was next prepared. This adhesive is available commercially as Monsanto 2591. The adhesive, which is a self-crosslinking system, consists of approximately 36% acrylic resin solids, with the remainder being a mixture of solvents, namely, toluene, ethyl acetate, and isopropanol.

The adhesive was reverse roll coated on a separate silicone coated polyester film casting sheet. The flexible carrier comprised two mil thick ultra-smooth H. P. Smith 2094 polyester film. The adhesive was dried at a line speed of 45 feet per minute. The final dry film thickness was about 1.2 mils. A three heating zone oven was again used, with the following zone temperatures: Zone 1: 140° F., Zone 2: 180° F., Zone 3: 200° F. Passing the adhesive through these three heating zones was sufficient to remove 99% of the solvents from the adhesive.

Figure 7:
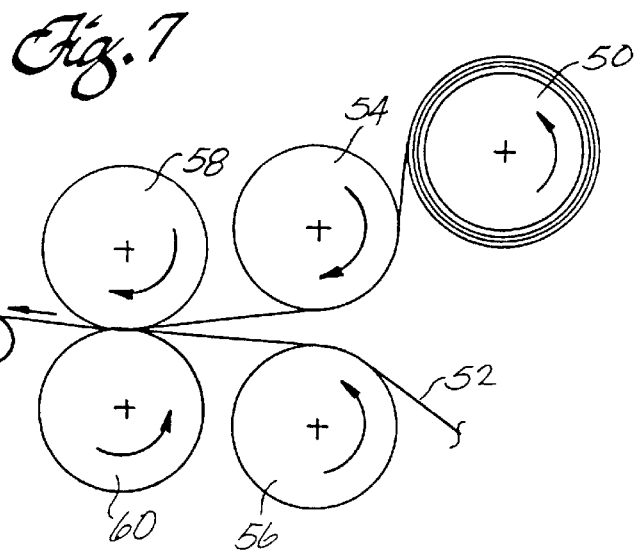
FIG. 7 is a schematic elevational view illustrating a laminating step in the process of this invention.

After the dried adhesive had exited the last oven zone, it was passed over a chill roll, and was then laminated to the PVC side of the paint coat in an operation illustrated in FIG. 7. In the laminating step, the paint-coated carrier 10, which includes the clear coat and color coat, is stored on a top unwind roll 50. The adhesive-coated carrier 12, in flat form, is shown at 52. The paint-coated sheet is passed around a drum 54, and the adhesive-coated carrier 52 is passed around a drum 56 spaced from the drum 54. The paint-coated carrier 10 and adhesive-coated sheet 20 then pass between a laminating drum 58 and a rubber back-up roll 60 for pressing the two sheets into contact to bond the adhesive layer to the color coat. Following the laminating step, the flexible paint-coated adhesive-backed laminate, with the carrier sheets 10 and 20 acting as outer liners on both sides of the laminate, is then passed around a roll 62 and onto a laminate rewind drum 64.

The adhesive coated construction was then sheeted and die cut to the desired shape. The sheeting operation occurs after the laminate has been unwound from the rewind drum 64. The top polyester liner (originally used for casting of the clear coat) was stripped away and replaced by an exterior automotive application tape (commonly known as a pre-mask), commercially available as American Biltrite X758. Before application, the bottom polyester liner (originally used for adhesive casting) was removed to expose the adhesive. The adhesive-coated side of the construction was applied to the automotive substrate. When the construction was positioned correctly, a squeegee was used to apply pressure, after which the pre-mask was removed.

The exterior automotive substrate was tested and the tests demonstrated the usefulness of the paint coat as an exterior automotive paint coat. The test results indicated that desirable appearance properties, including gloss and DOI, were produced. Gloss measured 70 units at 20 degrees. DOI measured 90%. The test panel passed gasoline resistance, acid resistance, abrasion resistance, impact resistance, QUV and humidity, and paint cycle exposure tests, according to test methods similar to those described above. A Volatile Haze test, as described above, revealed haze problems. Changes in the plasticizer formulation improved haze resistance as described in Example 4.

EXAMPLE 2

This series of tests studied the effects of several factors simultaneously, including: (1) The ratio of PVDF to polyethyl methacrylate in the clear coat; (2) The addition of a PVDF copolymer into the clear coat, where the copolymer replaced part of the PVDF polymer normally used; (3) The fusion temperature used for the clear coat; (4) The UV absorber level in the clear coat; (5) Post-process heat treating of the paint coat in which the finished paint coat is heated in a convection oven at 150–170° C. for ten minutes; (6) The method of application of the PVC color coat to the tie coat/clear coat (the usual method was to cast the PVC color coat to the tie coat/clear coat; the alternative was to cast the PVC by itself and laminate it to the tie coat); (7) Applying one or two coats of PVC; (8) The type of polyethyl methacrylate used in the clear coat; and (9) The level of plasticizer in the PVC color coat.

Each of these factors was studied at two levels in an orthogonal array of 16 experiments and included each of the factors at one of the two levels.

The following table shows the factors tested at each of the two levels.

| Factor | Level 1 | Level 2 | Manufacturer |
| --- | --- | --- | --- |
| PVDF/PEMA ratio | 72:28 | 65:35 | PVDF (301F)-Atochem PEMA (2042)-DuPont |
| Copolymer level | 0 phr | 5 phr | PVDF (10052)-Atochem |
| Fusion temp. | 350° F. | 370° F. | — |
| UV absorber level | 1 phr | 3 phr | Tinuvin 234-Ciba Geigy |
| Post-Process Heat Treating | yes | no | — |
| PVC Application Method | cold (lamination) | hot (direct coat) | — |
| 1 or 2 coats PVC | 1 coat | 2 coats | — |
| EMA type | 2042 | 2659 | DuPont (for both) |
| PVC Plasticizer Level | 20 phr | 35 phr | Two plasticizers used in combination: G-59 (C.P. Hall) EM 9776 (Emery) |

Each of the 16 experimental constructions was prepared and cast by methods described in Example 1, but in a laboratory setting. After the constructions were made, they were subjected to a variety of tests, for which a response was measured for each test. For instance, one of the tests involved the Volatile Haze test. Another measured response was the amount of intercoat adhesion between the clear coat and color coat, using a tape adhesion test. Additional properties tested were the tensile strength and elongation of the constructions.

The level averages for each factor were calculated, for each of the responses measured. For the gloss decrease response, the only factor which had any significant effect was (5), the post process heat treating of the paint coat. This led to the conclusion that post process heat treating could greatly reduce the amount of gloss decrease recorded in the Volatile Haze test.

For the intercoat adhesion response, the only significant factor was (6), the method of application of the PVC color coat. It was found that casting the PVC color coat separately and then laminating the clear coat to the color coat led to a high occurrence of intercoat adhesion failure. This confirmed that the best method of application was to cast the PVC color coat directly onto the tie coat.

EXAMPLE 3

Another set of experiments studied the paint coat by investigating the following factors: (1) Clear coat film thickness, (2) Tie coat thickness, (3) PVC plasticizer level, (4) PVC fusion temperature, and (5) PVC color coat film thickness. An array of 16 experimental samples were prepared in a manner similar to that described in Example 1, except for the second factor, tie coat thickness, in which the larger thicknesses of tie coat were applied with a Mayer rod, instead of the 137 HK gravure process.

Responses were measured, including room temperature elongation, tensile strength, shrinkage, and volatile haze factor. Responses showed that higher clear coat and color coat thicknesses produced better tensile strength and elongation; that shrinkage was minimized by reducing the thicknesses of the clear coat, tie coat, and PVC color coat; that having a high PVC level increases elongation but decreases tensile strength of the finished paint coat; and that a PVC fusion temperature between the highest and lowest levels produces the best elongation. The plasticizer used in the PVC layer affects elongation as well as tensile strength; volatile haze also can be affected by the particular plasticizer used.

It was concluded as follows: (1) The topcoat (clear coat) film thickness did not have a significant effect on overall results; (2) The tie coat thickness can remain at one gravure pass; better elongation, lower shrinkage, and less volatile haze were the deciding factors; (3) PVC plasticizer should be kept between 26 and 35 phr (parts per 100 PVC resin); this range gave the best results for shrinkage and elongation; (4) PVC fusion temperature should be kept at or below 184° C.; the lower elongation values recorded at 199° C. indicate that the paint coat may absorb too much heat at this higher temperature, causing brittleness; (5) PVC film thickness was determined to be best at 2.0–2.5 mils; although a greater thickness would produce better tensile and elongation, these improvements could not be justified because of the greater cost.

EXAMPLE 4

One of the problems experienced with the paint coat of Examples 1–3 was plasticizer migration from the PVC-based color coat to the surface of the clear coat when the film becomes heated. The plasticizer appears as a haze on the surface of the film, which decreases gloss.

To solve this problem, an experiment was conducted to determine whether a different plasticizer could eliminate or reduce the haze. The following PVC formula was used as a base:

| Ingredient | Parts |
| --- | --- |
| Aromatic Solvent (Hi-Sol 10) | 15.42 |
| 2-Ethyl Hexyl Acetate | 6.43 |
| UV Absorber (UV 531) | 2.06 |
| BaZn Heat Stabilizer (MK 2181) | 3.08 |
| Epoxy Heat Stabilizer (TC 909) | 2.06 |
| Acrylic Copolymer (B 99) | 2.57 |
| Polyvinyl Chloride (Geon 199) | 51.41 |
| Plasticizer | 16.97 |

Eight different plasticizers were substituted in the above formula, including EM-9776, EM-9789, EM-9790 (from Emery Corporation), PLR-100 (from Huls America), and G-25, G-59, P-670, and P-1070 (from C. P. Hall Corporation). At the time this experiment was conducted, the EM-9776 and G-59 were the plasticizers used in the PVC color coat formula.

The eight formulas were prepared and cast in methods similar to those used in Examples 1–3. The eight formulas were laminated to test panels, and the initial 20 degree gloss was measured. An "X" was also scribed in the surface of the film, so that the shrinkage could be measured. The panels were then heat aged for 24 hours at 70° C. (This time and temperature were sufficient to cause the plasticizer to migrate, and this test was considered a reasonable substitute for the usual Volatile Haze test run at 80° for two weeks.) At the end of 24 hours, the gloss was again recorded, along with the shrinkage, with the following results:

| Plasticizer | Initial 20° Gloss | Final 20° Gloss | shrinkage (mils) |
| --- | --- | --- | --- |
| EM-9776 | 60 | 22 | 37 |
| EM-9789 | 58 | 47 | 11 |
| EM-9790 | 60 | 49 | 11 |
| G-25 | 58 | 53 | 5 |
| G-59 | 58 | 25 | 33 |
| PLR-100 | 61 | 17 | 43 |
| P-670 | 60 | 33 | 27 |
| P-1070 | 60 | 13 | 47 |

These results showed that the G-25, EM-9789, and EM-9790 had the best gloss retention (gloss retention for 20° gloss was within 20% of its initial gloss measurement) and also had the lowest shrinkage. However, the G-25 had the disadvantage of having a very high viscosity which made compounding difficult. The EM-9790 was more convenient to use primarily because of its lower viscosity. On the basis of this experiment, the plasticizer system in the PVC color coat was changed from the G-59/EM-9776 to the EM-9789/EM-9790. This plasticizer system comprised polyester azelates (propylene glycol azelaic acids) having molecular weights (number average) of 7,080. When the paint coat containing the Emery 9789/Emery 9790 system was subjected to the Volatile Haze test, it was found that gloss retention after heat aging was sufficient to eliminate the need for post-process heat treating described in Example 2.

EXAMPLE 5

As the result of several designs of experiments, it was possible to construct a formulation which provided the best overall combination of properties. This formulation was tested in the PVC color coat, using a variety of pigments, including white, pearlescent, metallic, and clear (non-pigmented). These PVC color coats were prepared from the following base formula, to which the particular pigments were later added:

| Ingredient | Parts |
| --- | --- |
| Aromatic Solvent (Hi-Sol 10) | 22.84 |
| 2-Ethyl Hexyl Acetate | 7.59 |
| UV Absorber (UV 531) | 4.07 |
| CaZn Heat Stabilizer (MK 4119) | 3.49 |
| Epoxy Heat Stabilizer (TC 909) | 2.33 |
| Acrylic Copolymer (B 99) | 1.46 |
| Polyvinyl Chloride (Geon 199) | 58.22 |

This color coat formulation was used in combination with the PVDF-acrylic outer clear coat and the tie coat of Example 1.

As to the pigmented formulations, it was found that the EM 9789/EM 9790 plasticizer combination (with the EM 9790 used in the pigment dispersions, and the EM 9789 used to adjust the plasticizer level, if necessary) was the optimum plasticizer system. It was also found that the best combination of properties was obtained when the plasticizer-to-PVC resin ratio was set at 36 parts plasticizer to 100 parts PVC resin.

When the above base formulation was used as part of several pigmented PVC-based color coats, it was found that superior results were achieved in a number of tests, including: intercoat adhesion, accelerated UV resistance, shrinkage resistance, resistance to plasticizer migration, and gloss retention.

EXAMPLE 6

Figure 3:
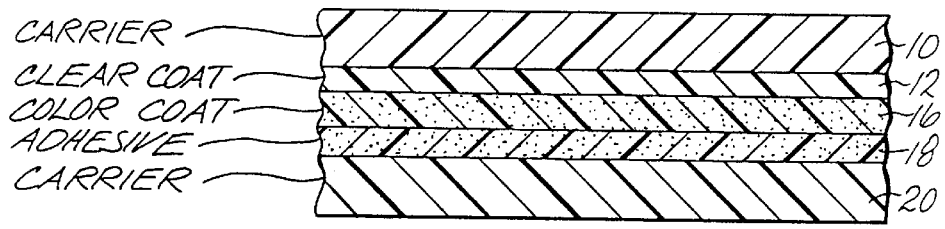

Tests were conducted to determine whether the PVDF-acrylic clear coat could be bonded to the PVC color coat without the use of a tie coat. The coating procedure followed was similar to that described in Example 1, except that the tie coat formulation and casting steps were omitted. The formulas for the clear coat, color coat, and adhesive were also similar to those in Example 1. The resulting construction is illustrated in FIG. 3.

Several tests were run on this construction, including initial peel adhesion, initial intercoat adhesion, water immersion, humidity, QUV, and Xenon Weatherometer. The initial peel and intercoat adhesion results were similar to those achieved with the construction containing the tie coat. After 96 hours of humidity exposure, the construction passed the tape test. After nearly 1500 hours in the QUV and 2000 hours in the xenon weatherometer exposure, signs of intercoat adhesion failure began to appear; specifically, the clear coat began to separate from the color coat. When these same samples were removed from the exposure cabinets, allowed to dry, and were subjected to the tape test, the intercoat adhesion failure was complete.

This result indicated that absence of the tie coat eventually led to intercoat adhesion failure in this test. The same construction having a tie coat 14 passed the same tests. Thus, it was concluded that a tie coat is necessary to improve interlayer adhesion between a PVDF-acrylic based clear coat and a PVC-containing color coat.

EXAMPLE 7

This experiment was conducted to determine whether the clear coat could be used as a protective layer in place of a two-package urethane that is often used as a protective layer for screen printed PVC films. This approach could provide some advantages to a screen printing converter. For example, the adhesive coated clear coat is available as a continuous sheet, as opposed to the two-package urethane, which is applied in a batch process one sheet at a time. This would allow screen printed PVC sheets to be continuously fed into a laminator. Also, since the clear coat is already a finished film, there would be no need to dry each sheet individually, as is necessary with a two-package urethane.

Figure 4:
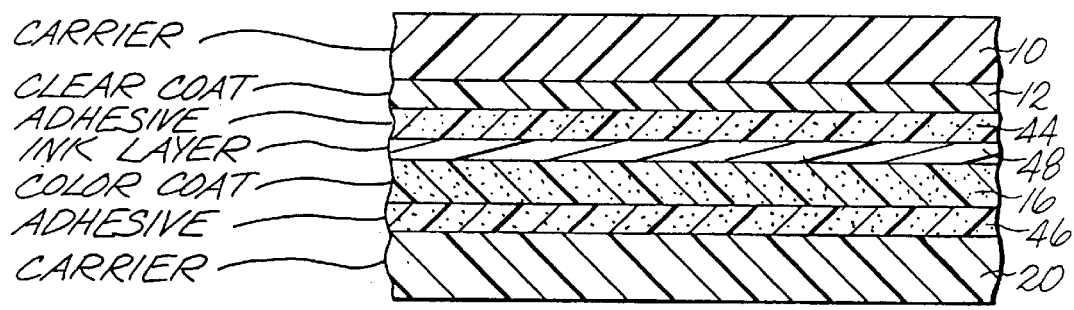

Referring to FIG. 4, the clear coat 12 was prepared and coated in a method similar to that described in Example 1, except that the clear coat was cast on a silicone coated paper carrier. An adhesive layer 44 was also prepared by a method similar to the adhesive 14 in Example 1, except that the adhesive was cast on a silicone coated paper carrier and directly laminated to the clear coat after the adhesive exited the drying oven, as illustrated in FIG. 7. The adhesive layer 44 had a dry film thickness of about 1.2 mils.

For this experiment, the PVC color coat 16 contained a white pigment prepared from the following formulation:

| Ingredient | Parts |
| --- | --- |
| Aromatic Solvent (Hi-Sol 10) | 15.03 |
| 2-Ethyl Hexyl Acetate | 5.00 |
| UV Absorber (UV 531) | 1.52 |
| BaZn Heat Stabilizer (MK2181) | 2.27 |
| Epoxy Heat Stabilizer (TC909) | 1.51 |
| Acrylic Copolymer (B 99) | 1.89 |
| Plasticizer (Emery 9789) | 2.01 |

| Ingredient | Parts |
| --- | --- |
| Polyvinyl Chloride (Geon 199) | 37.84 |
| White Dispersion | 32.93 |

The white dispersion comprised 59.1% Du Pont R960 white pigment and 9.1% Hi-Sol 10 in a vehicle of Emery 9790, available commercially as Harwick HCC-9978. The color coat was prepared by a procedure similar to that of the black color coat of Example 1. On a weight basis, the amount of pigment contained in the color coat formulation was about 19.5%. The total solids of the wet solution was 76.0%.

The white PVC-based color coat was coated directly onto a silicon coated paper liner available as H. P. Smith 8227. The film was cast to a dry film thickness of 2.2 mils. The line speeds and zone temperatures were similar to those used for the black PVC color coat of Example 1.

Referring again to FIG. 4, in an adhesive casting step, an acrylic-based pressure sensitive adhesive 46 was separately cast and dried and then laminated to the PVC color coat 16 as described in Example 1. The PVC color coat/adhesive construction was unwound from the roll and sheeted. One of these sheets was screen printed with five different colored acrylic-based inks, forming a composite ink layer 48. The inks were obtained from the Sinclair-Valentine Company. The screen printed material was dried in a convection oven for one hour at 160° F.

After the ink was dried, the screen printed sheet was allowed to cool to room temperature. The liner was then stripped from the adhesive coated side of the clear coat film, and the adhesive coated clear coat was pressure laminated to the screen printed side of the PVC sheet.

This construction was cut into several pieces and laminated to automotive test substrate panels. Initial gloss and distinctness-of-image readings were taken. Gloss measured 70 units at 20 degrees. DOI measured 30. The gloss reading was judged comparable to other paint coat constructions, but the DOI was much lower. The lower DOI was attributed to the adhesive layer between the screen printed ink layer and the clear coat and also because the adhesive was coated on a paper carrier sheet. Several other tests were run, including peel adhesions, intercoat adhesion, humidity, QUV, and xenon weatherometer. The construction showed good results for the adhesion and humidity tests. After 2000 hours QUV and xenon tests, the construction started to show a slight intercoat adhesion failure after the tape test.

The slight intercoat adhesion failure showed that an improvement was needed in the adhesive layer connecting the clear coat to the screen printed ink layer.

EXAMPLE 8

Figure 5:
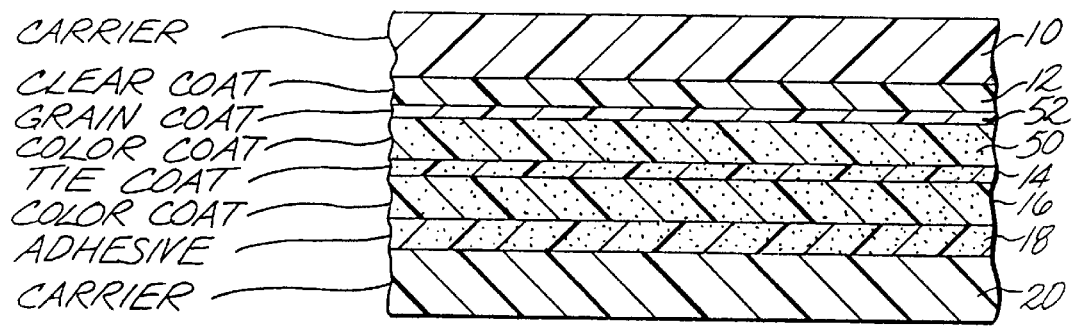

A paint coated laminate was formed as shown in FIG. 5. This construction included a PVDF-acrylic color coat 50 formed between the PVDF-acrylic clear coat 12 and the PVC color coat 16. A grain coat 52 made with multiple ink layers was formed between the PVDF-acrylic clear coat 12 and the PVDF-acrylic color coat 50. The grain coat, which is printed by a gravure process, produces an extra visual effect. The grain coat can provide a variety of patterns, such as a woodgrain, which requires multiple gravure coats. The tie coat 14 was used for bonding the PVC-containing color coat 16 to the PVDF-acrylic color coat 50. This construction was tested to determine whether it provided better elongation and weathering resistance than a construction without the PVDF-acrylic color coat 50.

The construction was made by first preparing the PVDF-acrylic clear coat 12, which had the same formulation as in Example 1, and was compounded, coated, and dried in the same manner also as in Example 1.

Next the grain coat was prepared by first making an intermediate formulation as follows:

| Ingredient | Parts |
| --- | --- |
| Methyl Ethyl Ketone (MEK) | 41.54 |
| Elvacite 2010 | 4.15 |
| Kynar 7201 | 12.45 |
| Tinuvin 234 | 0.33 |
| Methyl Propyl Ketone (MPK) | 41.53 |

The Elvacite 2010 was added to the MEK under high agitation, followed by the Kynar 7201 and Tinuvin 234. This mixture was allowed to heat to 130° F. to dissolve the resins. The MPK was then added and the mixing container was weighed. MEK was then added to make up for the solvent lost during mixing, to form the finished intermediate formulations.

The grain coat was next prepared from the following formulation:

| Ingredient | Parts |
| --- | --- |
| Intermediate | 84.07 |
| Methyl Propyl Ketone (MPK) | 12.79 |
| 93 QA Violet (DP 37100) | 0.92 |
| 93 Carbon Black (DP 39100) | 1.70 |
| 93 IR Blue (DP 34200) | 0.52 |

The DP dispersions consist of pigment in a vehicle of Rohm and Haas B735 acrylic resin, available commercially from the Gibraltar Chemical Co.

The grain coat was prepared by adding the MPK to the intermediate formulation, and then adding the DP dispersions under low agitation.

The grain coat was applied to the clear coat at the same thickness, line speed, gravure cylinder, and oven conditions as the tie coat in Example 1.

The PVDF-acrylic color coat was prepared from the following formulations.

| Ingredient | Parts |
| --- | --- |
| n-Propyl Acetate (NPAC) | 62.95 |
| Elvacite 2043 | 12.35 |
| Kynar 9301 | 12.35 |
| Aluminum flake (L 54894) | 12.35 |

The L 54894 consisted of aluminum flake dispersed in isopropyl acetate, and is available commercially from Avery-Dennison. This color coat was prepared by adding the Elvacite 2043 and Kynar 9301 to the NPAC and mixing under high agitation. After the resins were completely dissolved, the L 54894 was added and mixed under low agitation.

The PVDF-acrylic color coat was coated and dried under the same conditions as the PVDF-acrylic clear coat.

At this point, a portion of the construction was set aside for future testing. This was done so that a comparison could later be made between the construction both with and without the PVC color coat.

The acrylic-based tie coat was prepared by the same procedures as in Example 1.

The final coating to be cast was the PVC color coat, which was a white color coat with the same formulate as in Example 3. It was processed at the same line speeds and oven zone temperatures as in Example 1.

Next, the acrylic-based pressure-sensitive adhesive was prepared, cast, dried and laminated to the PVC color coat as described in Example 1. The same adhesive was also laminated to the construction that did not have the tie coat and PVC color coat.

Both constructions were tested for room temperature elongation. The average elongation value for the construction with no PVC color coat was 16%. The average elongation value for the construction with PVC color coat was 70%. These measurements showed that the addition of the PVC color coat enhanced elongation of the finished paint coated, adhesive-backed laminate.

The PVDF-acrylic color coat 50 contains a uniformly dispersed pigment which acts as a UV absorber and thereby reduces UV degradation of the underlying PVC-containing color coat 16. The pigments in the color coat 50 enhance opacity of the finished laminate, as well as the pigments in the color coat 16. UV stabilizers contained in the PVC color coat also provide an added level of UV protection for the PVC color coat. The PVC color coat contains a plasticizer for enhanced elongation. The pigment loading in the PVC color coat retains the plasticizer, inhibits its migration, and prevents intercoat adhesion failure.

As a result of this experiment, it was concluded that a PVC color coat was necessary for the paint coat construction, in order to provide adequate elongation values, along with the good exterior automotive properties of high gloss and DOI and weatherability provided by the composite PVDF-acrylic clear coat and the PVC-based color coat.

What is claimed is:

1. A method of forming a flexible decorative sheet for use in applying an exterior automotive clear coat/color coat paint finish to a substrate panel, comprising the steps of:

casting a first coat comprising an optically clear, smooth, weatherable thin film on a first flexible, heat-resistant carrier sheet, the first coat comprising a blend of a fluoropolymer resin and an acrylic resin, the first coat being dried on the first carrier sheet;

casting a second coat as a thin film on one side of the clear first coat, the second coat containing a vinyl chloride polymer and a pigment dispersed in the second coat or in a separate color coat layer on a side of the second coat opposite from the first coat, thereby forming a composite paint coat in combination with the first and second coats; and separately casting a layer of a pressure sensitive adhesive on a second flexible, heat-resistant carrier sheet, the pressure sensitive adhesive layer being dried on the second carrier sheet, followed by laminating the carrier-supported pressure sensitive adhesive layer to the carrier-supported composite paint coat, the pressure sensitive adhesive layer laminated to a side of the second coat opposite from the first coat, and leaving the first and second carrier sheets adhered to the first coat and the pressure sensitive adhesive layer, respectively, to provide removable protective outer sheets for a flexible, self-supporting composite paint coat comprised of the first coat and the second coat;

the second carrier sheet being removable from the pressure sensitive adhesive layer for adhering the pressure sensitive adhesive side of the composite paint coat to a substrate panel;

the first carrier sheet being removable from the first coat to expose the first coat as a glossy automotive quality clear coat with the second coat visible through the clear coat, in which the exterior surface of the composite paint coat has an exterior automotive quality gloss level and a distinctness-of-image value greater than about 60, the second coat containing a plasticizer in an amount sufficient to enhance elongation of the second coat and to inhibit plasticizer-induced volatile haze in the finished composite paint coat as measured by a less than 20% reduction of said gloss level when subjected to a temperature of 80° C.;

the second coat having sufficient elongation to enhance the elongation of the clear first coat so that the composite paint coat has a level of elongation in the range from about 50% to about 150% the original dimension of the composite paint coat sufficient to conform to a three-dimensionally contoured shape of the substrate panel to which the adhesive layer of the composite paint coat is bonded for forming a defect-free, smooth, glossy, weatherable exterior automotive paint finish on the substrate without significantly reducing the exterior automotive properties of the composite paint coat, the composite paint coat undergoing said 50% to 150% elongation while the distinctness-of-image of the composite paint coat following such elongation is at a level above about 60.

2. The method according to claim 1 in which the DOI is greater than 90.

3. The method according to claim 1 in which the plasticizer and the pigment is such that Volatile Haze of the decorative sheet is sufficiently reduced that post-process heat treatment is omitted.

4. The method according to claim 1 in which the color coat includes a UV absorber and a heat stabilizer.

5. The method according to claim 1 in which the plasticizer has a molecular weight greater than about 7,000.

6. The method according to claim 5, in which the plasticizer comprises a polyester azelate.

7. The method according to claim 1 in which the second carrier on which the pressure-sensitive adhesive is cast is a smooth surfaced polyester casting sheet.

8. The method according to claim 1 in which the second coat comprises from 26 to 36 parts plasticizer per 100 parts vinyl chloride polymer.

9. A method of forming a flexible decorative sheet for use in applying an exterior automotive clear coat/color coat paint finish to a substrate panel, comprising the steps of:

casting a first coat comprising an optically clear, smooth, weatherable thin film on a first flexible, heat-resistant carrier sheet, the first coat comprising a blend of a fluoropolymer resin and an acrylic resin, the first coat being dried on the first carrier sheet;

casting a second coat as a thin film on a side of the first coat, the second coat containing a vinyl chloride polymer, a plasticizer containing polyester azelate having a molecular weight greater than about 7,000, and a pigment dispersed in the second coat or in a separate color coat layer on a side of the second coat opposite from the first coat, thereby forming a composite paint coat in combination with the first and second coats; and separately casting a layer of a pressure sensitive adhesive on a second flexible, heat-resistant carrier sheet, the pressure sensitive adhesive layer being dried on the second carrier sheet, followed by laminating the carrier-supported pressure sensitive adhesive layer to the carrier-supported composite paint coat, the pressure sensitive adhesive laminated to a side of the second coat opposite from the first coat, and leaving the first and second carrier sheets adhered to the first coat and the pressure sensitive adhesive layer, respectively, to provide removable protective outer sheets for a flexible, self-supporting composite paint coat comprised of the first coat and the second coat;

the second carrier sheet being removable from the pressure sensitive adhesive layer for adhering the pressure sensitive adhesive side of the second coat to a substrate panel;

the first carrier sheet being removable from the first coat to expose the first coat as a glossy automotive quality paint coat with the color coat visible through the clear coat, in which the exterior surface of the composite paint coat has an exterior automotive quality gloss level and a distinctness-of-image value greater than about 60, the second coat containing a plasticizer in an amount sufficient to enhance elongation of the second coat and to inhibit plasticizer-induced volatile haze in the finished composite paint coat as measured by a less than 20% reduction of said gloss level when subjected to a temperature of 80° C.;

the second coat having sufficient elongation to enhance the elongation of the clear first coat so that the composite paint coat has a level of elongation in the range from about 50% to about 150% the original dimension of the composite paint coat sufficient to conform to a three-dimensionally contoured shape of the substrate panel to which the adhesive layer of the paint coat is bonded for forming a defect-free, smooth, glossy, weatherable exterior automotive paint finish on the substrate without significantly reducing the exterior automotive properties of the composite paint coat, the composite paint coat undergoing said 50% to 150% elongation while the distinctness-of-image of the composite paint coat following such elongation is at a level above about 60.

10. The method according to claim 9 in which 20 degree gloss retention is within 20% of its initial gloss measurement for a decorative sheet subjected to volatile haze testing.

11. The method according to claim 9 in which the second carrier on which the pressure sensitive adhesive is cast is a smooth surfaced polyester casting sheet.

12. The method according to claim 9 in which the second coat comprises from 26 to 36 parts plasticizer per 100 parts vinyl chloride polymer.

13. A method of forming a flexible decorative sheet for use in applying an exterior automotive clear coat/color coat paint finish to a substrate panel, comprising the steps of:

casting a first coat comprising an optically clear, smooth, weatherable thin film on a first flexible, heat-resistant carrier sheet, the first coat comprising a blend of a fluoropolymer resin and an acrylic resin, the first coat being dried on the first carrier sheet;

casting a second coat as a thin film on a side of the first coat, the second coat containing a vinyl chloride polymer, and a pigment dispersed in the second coat or in a separate color coat layer on a side of the second coat opposite from the first coat, thereby forming a composite paint coat in combination with the first and second coats; and separately casting a layer of a pressure sensitive adhesive on a second flexible, heat-resistant carrier sheet, the pressure sensitive adhesive layer being dried on the second carrier sheet, followed by laminating the carrier-supported pressure sensitive adhesive layer to the carrier-supported composite paint coat, the pressure sensitive adhesive laminated to a side of the second coat opposite from the first coat, and leaving the first and second carrier sheets adhered to the first coat and the pressure sensitive adhesive layer, respectively, to provide removable protective outer sheets for a flexible, self-supporting composite paint coat comprised of the first coat and the second coat;

the second carrier sheet being removable from the pressure sensitive adhesive layer for adhering the pressure sensitive adhesive side of the second coat to a substrate panel;

the first carrier sheet being removable from the first coat to expose the first coat as a glossy automotive quality paint coat with the color coat visible through the clear coat, in which the exterior surface of the composite paint coat has an exterior automotive quality gloss level and a distinctness-of-image value greater than about 60, the second coat containing a plasticizer containing a polyester azelate in an amount sufficient to enhance elongation of the second coat and to inhibit plasticizer-induced volatile haze in the finished composite paint coat as measured by a less than 20% reduction of said gloss level when subjected to a temperature of 80° C.;

the second coat having sufficient elongation to enhance the elongation of the clear first coat so that the composite paint coat has a level of elongation in the range from about 50% to about 150% the original dimension of the composite paint coat sufficient to conform to a three-dimensionally contoured shape of the substrate panel to which the adhesive layer of the paint coat is bonded for forming a defect-free, smooth, glossy, weatherable exterior automotive paint finish on the substrate without significantly reducing the exterior automotive properties of the composite paint coat, the composite paint coat undergoing said 50% to 150% elongation while the distinctness-of-image of the composite paint coat following such elongation is at a level above about 60.

14. The method according to claim 13 in which 20 degree gloss retention is within 20% of its initial gloss measurement for a decorative sheet subjected to volatile haze testing.

15. The method according to claim 13 in which the second carrier on which the pressure sensitive adhesive is cast is a smooth surfaced polyester casting sheet.

16. The method according to claim 13 in which the second coat comprises from 26 to 36 parts plasticizer per 100 parts vinyl chloride polymer.

* * * * *